United States Patent
Mayor et al.

(10) Patent No.: US 7,921,572 B2
(45) Date of Patent: Apr. 12, 2011

(54) ACCURACY INDICATIONS FOR AN ELECTRONIC COMPASS IN A PORTABLE DEVICE

(75) Inventors: Robert Mayor, Half Moon Bay, CA (US); Patrick S. Piemonte, San Francisco, CA (US); Ronald K. Huang, Milpitas, CA (US); Parin Patel, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 13 days.

(21) Appl. No.: 12/479,196

(22) Filed: Jun. 5, 2009

(65) Prior Publication Data

US 2010/0307015 A1    Dec. 9, 2010

(51) Int. Cl.
*G01C 17/38*    (2006.01)

(52) U.S. Cl. ........................................... 33/356

(58) Field of Classification Search ...................... 33/356
See application file for complete search history.

(56) References Cited

U.S. PATENT DOCUMENTS

| | | | |
|---|---|---|---|
| 5,761,094 A | 6/1998 | Olson et al. | |
| 5,946,813 A | 9/1999 | Nachbaur et al. | |
| 6,311,129 B1 | 10/2001 | Lin | |
| 6,408,245 B1 | 6/2002 | An et al. | |
| 6,424,914 B1 | 7/2002 | Lin | |
| 6,508,316 B2 | 1/2003 | Estes et al. | |
| 6,539,639 B2 | 4/2003 | Smith | |
| 6,622,091 B2 | 9/2003 | Perlmutter et al. | |
| 6,651,003 B2 | 11/2003 | Woloszyk et al. | |
| 6,807,485 B1 | 10/2004 | Green | |
| 6,964,107 B1 * | 11/2005 | Ahola | 33/356 |
| 6,988,049 B1 | 1/2006 | Wirtz et al. | |
| 7,210,236 B2 | 5/2007 | Sato et al | |
| 7,248,983 B2 | 7/2007 | Fillatreau et al. | |
| 7,275,008 B2 | 9/2007 | Plyvänäinen | |
| 7,391,366 B2 | 6/2008 | Park et al. | |
| 7,451,549 B1 | 11/2008 | Sodhi et al. | |
| 7,458,166 B2 | 12/2008 | Parks et al. | |
| 2003/0135327 A1 | 7/2003 | Levine et al. | |
| 2005/0223575 A1 | 10/2005 | Fillatreau et al. | |
| 2006/0190174 A1 | 8/2006 | Li et al. | |
| 2006/0195254 A1 | 8/2006 | Ladetto et al. | |
| 2008/0066331 A1 | 3/2008 | Brzezinski et al. | |
| 2008/0201096 A1 | 8/2008 | Wright et al. | |
| 2009/0089001 A1 | 4/2009 | Lin | |
| 2009/0171607 A1 | 7/2009 | Chen et al. | |
| 2010/0121599 A1 | 5/2010 | Boeve et al. | |

OTHER PUBLICATIONS

Apptism, iTopoMaps, © 2009 Apptism, [Online] [Retrieved on Jun. 2, 2009]. Retrieved from the Internet: URL: http://www.apptism.com/apps/itopomaps, (4 pages).

Apptism, Compass Go, © 2009, Apptism, [Online] [Retrieved on Jun. 3, 2009]. Retrieved from the Internet: URL: http://www.apptism.com/apps/compass-go, (2 pages).

Apptism, Focalware, © 2009 Apptism, [Online] [Retrieved on Jun. 3, 2009]. Retrieved from the Internet: URL: http://www.apptism.com/apps/focalware, (2 pages).

(Continued)

*Primary Examiner* — Christopher W Fulton
(74) *Attorney, Agent, or Firm* — Blakely, Sokoloff, Taylor & Zafman LLP

(57) ABSTRACT

Multiple instances of a geomagnetic field are calculated. Multiple instances of an average magnitude of a subset of the instances of the geomagnetic field are also calculated. When the average magnitude changes by more than a first predetermined threshold, the user is informed that compass accuracy has degraded. Other embodiments are also described and claimed.

20 Claims, 3 Drawing Sheets

OTHER PUBLICATIONS

U.S. Appl. No. 12/479,483, filed Jun. 5, 2009, entitled "Restoring and Storing Magnetometer Calibration Data", Inventors: Mayor, et al., (Whole Document).

U.S. Appl. No. 12/477,865, filed Jun. 3, 2009, entitled "Automatically Identifying Geographic Direction", inventors: Huang, et al., (Whole Document).

U.S. Appl. No. 12/479,717, filed Jun. 5, 2009, entitled "Magnetometer Accuracy and Use", inventors: Mayor, et al., (Whole Document).

U.S. Appl. No. 12/549,250, filed Aug. 27, 2009, entitled "Context Determination to Assist Location Determination Accuracy", inventors: Mayor, et al., (Whole Document).

"Calibration Computations for Practical Compassing Using the PNI-11096 Magnetometer ASIC", Aug. 2008, PNI Sensor Corporation © 2001, PNI Corporation Santa Rosa, CA, USA, (3 pages).

"Multipoint Calibration Primer", PNI Sensor Corporation, (no publication date available), PNI Corporation, Santa Rosa, CA, (10 pages).

"The Earth's Magnetic Field", EPS 122: Lecture 5—Earth's magnetic field, (11 pages).

"The Earth's Magnetic Field—An Overview", An Overview of the Earth's Magnetic Field, [Online] [Retrieved on May 16, 2009]. Retrieved from the Internet: URL: http://www.geomag.bgs.ac.uk/earthmag.html, (10 pages).

Cho, Seong Y., et al., "A Calibration Technique for a Two-Axis Magnetic Compass in Telematics Devices", ETRI Journal, vol. 27, No. 3, Jun. 2005, (pp. 280-288).

Goulet, Chris M., "Magnetic Declination, Frequently Asked Questions", Version 4.4, Oct. 2001, [Online] [Retrieved on May 16, 2009]. Retrieved from the Internet: URL: http://www.geocities.com/magnetic_declination/, (16 pages).

U.S. Appl. No. 12/886,531, filed Sep. 20, 2010, entitled "Determining Heading Using Magnetometer Data and Angular Rate Data", Inventors: Piemonte, et al., (Whole Document).

U.S. Appl. No. 12/899,392, filed Oct. 6, 2010, entitled "Magnetometer Calibration", Inventor: Tu, (Whole Document).

Camps, Frédéric, et al., "Numerical Calibration for 3-Axis Accelerometers and Magnetometers", IEEE, 2009, (pp. 217-221).

Zhang, Xiaoming, et al., "A Novel Auto-Calibration Method for the Vector Magnetometer", The Ninth International Conference on Electronic Measurement & Instruments, ICEMI 2009, (pp. 1-145 through 1-150).

* cited by examiner

ACCURACY INDICATIONS FOR AN ELECTRONIC COMPASS IN A PORTABLE DEVICE

Some of the subject matter described in this application is related to material in U.S. application Ser. No. 12/479,717, entitled "Magnetometer Accuracy and Use", which was filed on Jun. 5, 2009, (the same date as this application) and is currently pending.

An embodiment of the invention is related to techniques for indicating the accuracy of direction output by an electronic compass that is integrated in a portable electronic device. Other embodiments are also described.

BACKGROUND

A portable device such as a cellular phone or a smart phone can now be equipped with an electronic compass. The compass calculates and provides its user with a direction, which may be a "heading" (typically given relative to the Earth's magnetic field which is also referred to as the geomagnetic field), and/or an arrow pointing to true north. The direction information may be provided for the user's own navigation knowledge, for example, to tell him which way is north while he is walking or driving in unfamiliar surroundings. The direction information is also beneficial for use by a navigation or map application that may be running in the device.

The electronic compass obtains a measure of the magnetic field that is present in its immediate surrounding as a three-component (e.g., in x, y, and z directions) vector, using a 3-axis magnetic sensor. The sensed field contains a contribution by the Earth's magnetic field, and a contribution by a so-called local interference field. The latter is the magnetic field that is created by components in the local environment of the portable device. This may include contributions by any magnetic component that is near the sensor, such as a loudspeaker that is built into the device. The interference field may also have a contribution due to magnetic elements found in the external environment close to the device, such as when the user is driving an automobile, riding in a train or bus, or riding on a bicycle or motorcycle.

In most cases, the interference field is not negligible relative to the Earth field. Therefore, a calibration procedure is needed to estimate and then remove the interference field contribution from the sensor's measurements, in order to allow the compass to calculate the correct direction at that moment. There are several types of 3-axis calibration procedures. In one such technique, the user is instructed to rotate the device (containing the compass) according to a set of geometrically different orientations and azimuth angles, while measurements by the compass and by an orientation sensor are collected and analyzed so as to isolate or solve for the interference field. The solved interference field is then removed from a measurement taken by the magnetic sensor, to yield the geomagnetic field (which may then be further corrected into the true north direction).

In another 3-axis calibration technique, rather than instruct the user to deliberately rotate the device in a predetermined manner, many measurements are collected from the compass, continuously over a period of time, while the device is being used or carried by the user in the usual course. This typically leads to random albeit sufficient rotations of the device, which enable solving for the interference field. This technique is desirably transparent to the user because the user is not required to go through a procedure where he must deliberately rotate the device through a specified set of orientations.

The magnetic conditions surrounding the magnetic sensor typically change over time, for example as the user carrying the portable device moves into different locations, reconfigures the device (e.g., opens or closes a clam shell type cellular phone), or places the device near objects that have different magnetic signatures. The magnetic sensor can also drift over time. As a result, the compass needs to be recalibrated often. With existing techniques, calibration output data is verified by comparing it to certain calibration criteria; the data is either rejected (if the criteria are not met) or it is passed on to a heading computation process (if the criteria are met). Once a new heading has been computed using the validated calibration output data, the new heading is verified by comparing it to certain heading criteria; the new heading is either rejected (if the criteria are not met) or accepted (if the criteria are met), where in the latter case it will then be displayed to the user or used by a navigation application running in the portable device.

SUMMARY

One of the drawbacks of current electronic compass technology, integrated in a portable device such as a smart phone or cellular phone, is that due to being subjected to widespread and variable magnetic interference sources, the compass direction output is in error quite often. This characteristic of the integrated compass may be ameliorated, by providing the end user of the portable device with suitable accuracy indications.

In accordance with an embodiment of the invention, a machine-implemented method in the portable device operates as follows. Multiple instances of an average magnitude of the calculated geomagnetic field are computed and monitored, as the portable and in particular its compass function is being used in its normal course by the end user. If the average magnitude changes by more than a given threshold, then the user is informed that compass accuracy has degraded. For example, an error bound may be estimated for the compass' direction output; in that case, the device can speak or display to its end user an updated (degraded), error bound estimate. The error bound may be given in absolute degrees or as a percentage, or it may be given as a certainty indication, e.g. the level of confidence in the correctness of the direction output.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Several embodiments of the invention with reference to the appended drawings are now explained. While numerous details are set forth, it is understood that some embodiments of the invention may be practiced without these details. In other instances, well-known circuits, structures, and techniques have not been shown in detail so as not to obscure the understanding of this description.

A compass outputs a direction, either a heading or a vector pointing to true north. An electronic compass has a magnetic sensor also referred to as a magnetometer that cannot tell the difference between the geomagnetic field and the local interference field. A calibration procedure is used to find and remove the interference field, so as to determine the geomagnetic field. However, the accuracy of a compass that is integrated in a portable device is uniquely challenging. In accordance with the embodiments of the invention described below, the portable device is equipped with an improved capability of providing its end user with suitable accuracy indications, so that the overall end user experience is bettered.

Figure 1:
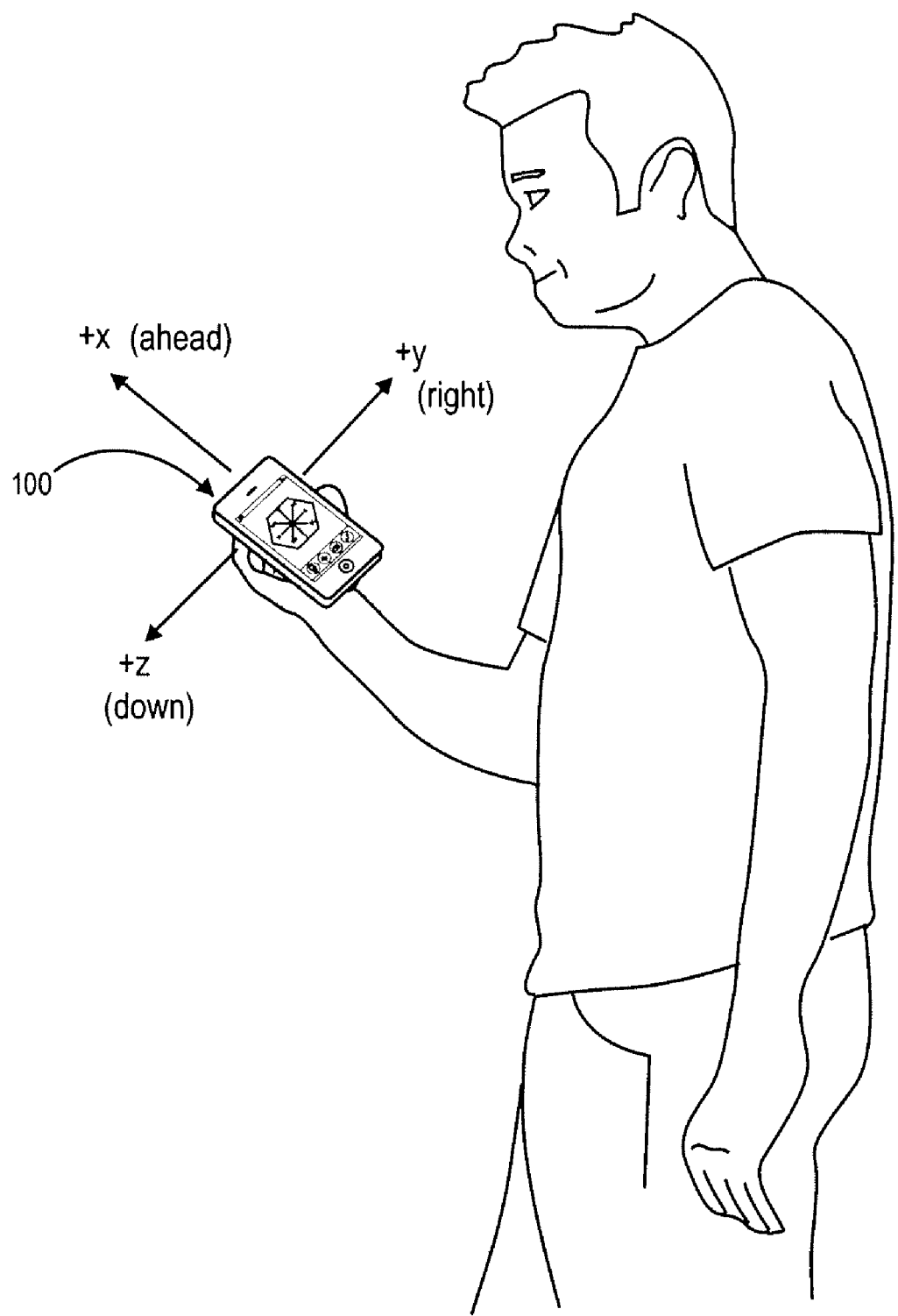
FIG. 1 depicts an example portable device being carried by the end user, with a compass function operating in device.

A portable device 100 having an integrated compass function is depicted in FIG. 1, as an otherwise conventional smart phone containing a loudspeaker, the latter being an example magnetic component that contributes substantially to the interference field. However, the compass techniques described here are also applicable to other types of portable devices that have a built-in compass, such as a cellular phone or a dedicated navigation device.

As explained below, the accuracy of the compass in such a portable device can vary greatly depending upon how the device 100 is being carried or used by its end user; this is referred to as the particular user context in which the portable device 100 finds itself. The local magnetic interference field can change depending upon user context; for example, when the user boards a vehicle or moves to a location that changes the interference field, the previously calibrated estimate of the geomagnetic field may no longer be accurate.

Figure 2:
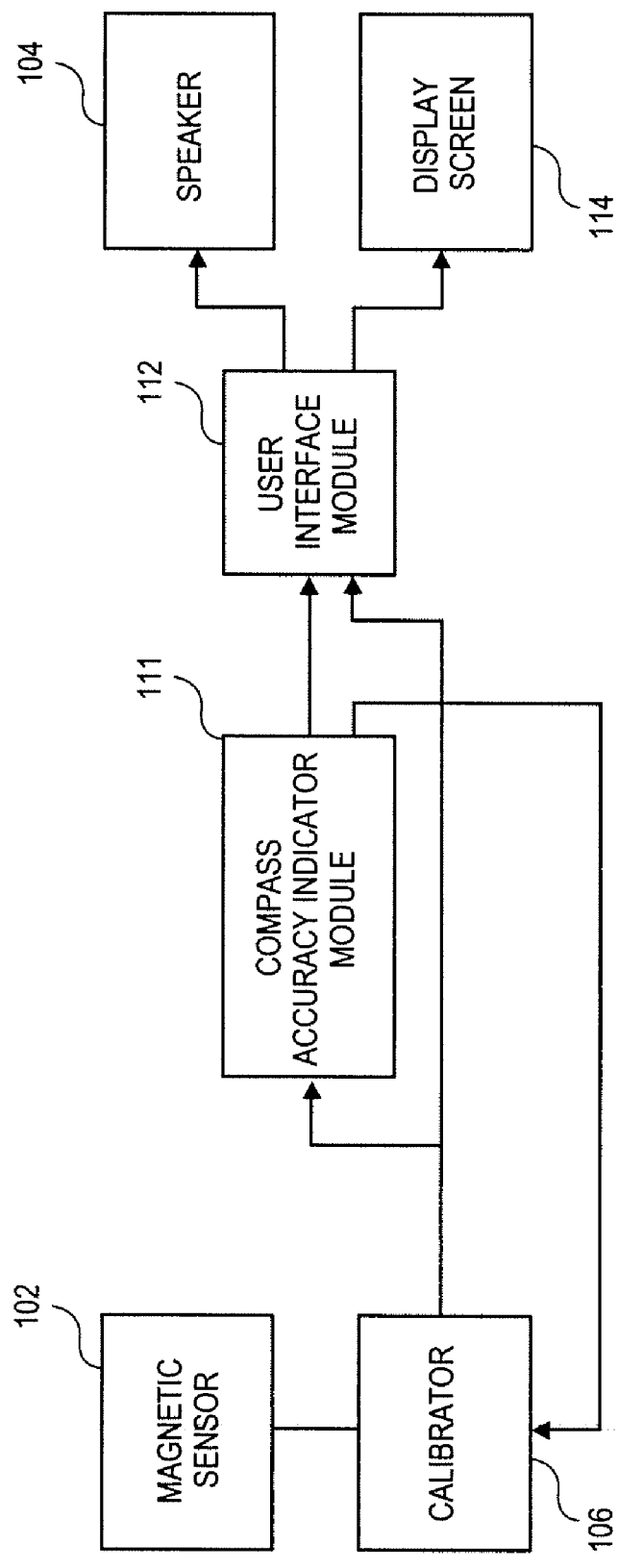
FIG. 2 is a block diagram showing some functional components of the portable device relevant to its compass function, in accordance with a first embodiment of the invention.

Referring now to FIG. 2, this is a block diagram showing some functional components of the portable device 100 relevant to its compass function. In accordance with a first embodiment of the invention, the portable device 100 is provided with a compass accuracy indicator module 111 that improves the overall end user experience by automatically informing the user that compass accuracy has degraded. This capability is now explained, beginning with a description of each of the components illustrated in FIG. 2

The compass function is performed using a magnetic sensor 102. This may be a conventional 3-axis magnetometer that senses the local magnetic field and outputs a vector having three components (e.g., x, y and z axis components). An example orientation of the sensor 102 inside the device 100 may be as shown in FIG. 1, where positive x-axis points straight ahead, the positive y-axis points to the right of the user, and the positive z-axis points downward—other orientations of the sensor relative to the housing of the device 100 are possible. The sensor 102 may be implemented as part of a separate, integrated circuit or microelectronic die referred to as a compass chip.

The compass function also needs a calibrator 106 so that the unwanted interference field contribution can be identified and removed from a measurement provided by the magnetic sensor 102. In one embodiment, the calibrator 106 is a programmed processor that performs a conventional 3-axis calibration procedure, by instructing the user to rotate the device 100 according to a set of geometrically different orientations or azimuth angles, while measurements by the sensor 102 are collected and analyzed so as to isolate the interference field. The solved for interference field is then removed from a measurement taken by the magnetic sensor 102 (e.g., via subtraction and scaling), to provide the estimated or calibrated geomagnetic field, which may be defined as the vector (Fx, Fy, Fz).

In another 3-axis calibration technique, rather than expect or require that the user deliberately must rotate the device 100 in a certain manner, the calibrator 106 continuously collects a number of measurements from the sensor 102 over a period of time, while the device is being used or carried by its user in the usual course. This typically leads to random albeit sufficient rotations of the device 100, such that the unknown interference field vector can be solved for. This technique is desirably transparent to the user because the user is not required to deliberately rotate the device 100 to go through a specified set of orientations.

The calibrator 106 can compute multiple instances of the geomagnetic field vector F, where F=(Fx, Fy, Fz). This is done as time passes, while the compass function is enabled in the portable device 100 and the end user is using the device 100 in its normal course. These instances of the estimated geomagnetic field are then provided to the compass accuracy indicator module 111, which calculates multiple instances of an average magnitude of a subset of the instances of the geomagnetic field. The magnitude of a given instance is given by $$|Fi|=\text{square\_root}(Fxi2+Fyi2+Fzi**2)$$

and the average of N instances may be computed as $$\text{average}=\text{sum}(|F1|, |F2|, \ldots, |FN|)/N$$

Each instance of the average magnitude is based on a different set of instances of the geomagnetic field, like a running or moving average of the geomagnetic field magnitude. When the moving average changes by more than a predetermined threshold, e.g. it starts to vary by more than a certain percentage, then the accuracy indicator module 111 has detected that compass accuracy has degraded. In other words, the instances of the geomagnetic field being output by the calibrator 106 at around that point in time and thereafter are considered to have reduced accuracy.

The compass accuracy indicator module 111 may also compute or estimate an error bound (e.g., as an absolute range in degrees such as +/−X degrees, or as a percentage range such as +/−Y%) for a computed direction given by the compass function, in accordance with known techniques. This error bound may be continuously updated over a period of time, in the usual course of use of the device 100, and presented to the user.

A user interface module 112 is coupled to drive either one or both of a speaker 104 and a display screen 114 of the portable device 100. The user interface module 112, which may also be a programmed processor, receives commands from the compass accuracy indicator module 111 to inform the user that compass accuracy has degraded. This may be done using an audible tone or speech sequence played through the speaker 104, and/or a graphic or text object displayed on the screen 114. The user interface module 112 may have access to other types of mechanisms that deliver information to the user, which may be combined or used singly, including a screen back light that can be pulsed and a haptic or tactile device (e.g., a conventional mobile phone vibrator).

The latter two mechanisms are suitable for giving a simple alert to the user, whereas the artificial speech sequence and graphic or text objects are suitable for giving more specific updates about the accuracy (e.g., displaying an updated, estimated error bound, or an updated, certainty which indicates the likelihood of the current direction output being correct).

Figure 3:
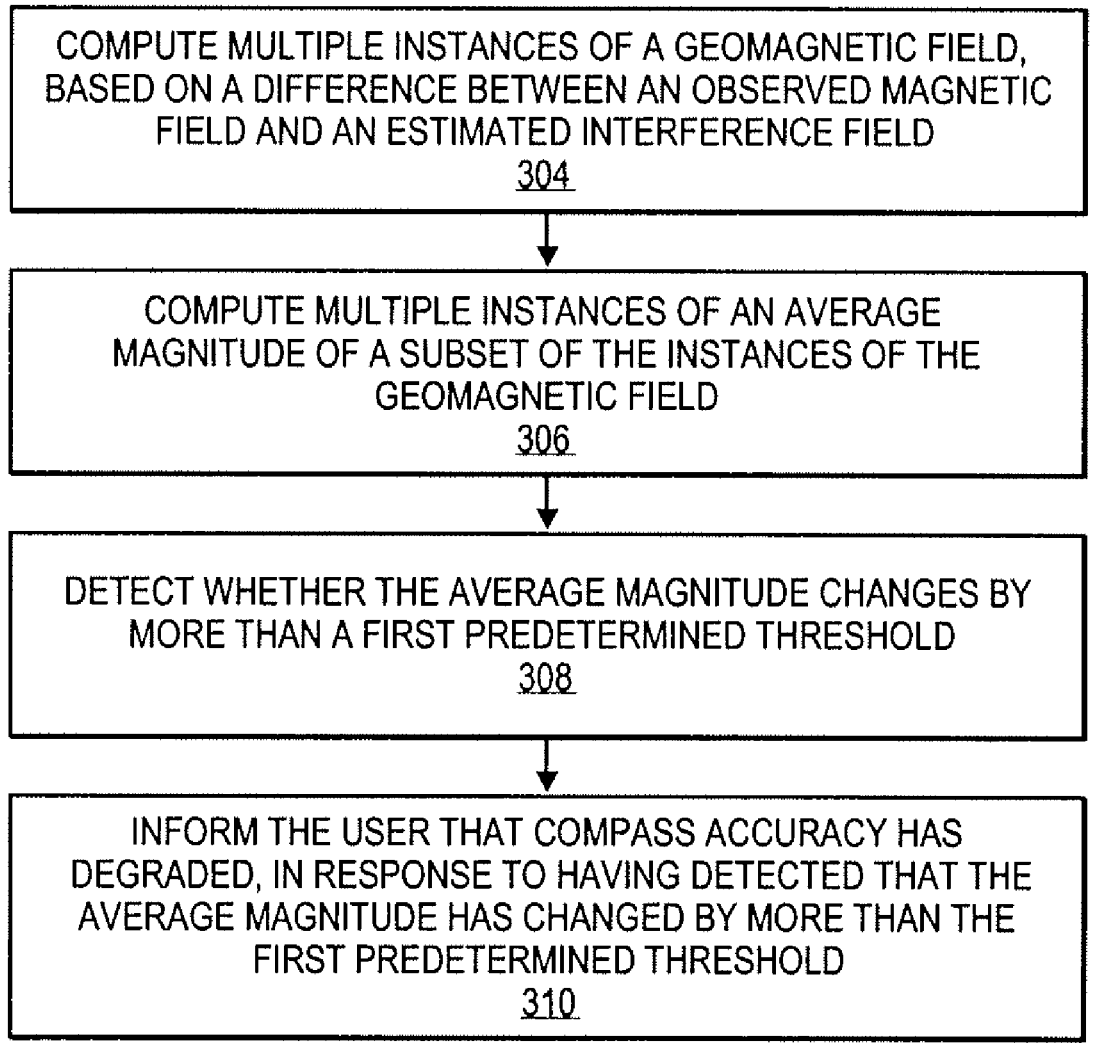
FIG. 3 is a flow diagram of an example process for indicating accuracy of the compass function, in accordance with the first embodiment of the invention.

FIG. 3 is a flow diagram of an example process for indicating accuracy of the compass function, in accordance with the first embodiment of the invention. This is a machine-implemented method, i.e. performed by the portable device 100, for providing the end user of the device 100 with accuracy indications for an integrated compass. In operation 304, multiple instances of a geomagnetic field, based on a difference between an observed magnetic field and an estimated interference field, are computed. As suggested above, a magnetic measurement space scaling factor may also be applied, to further correct the observed magnetic field output by the magnetic sensor 102.

In operation 306, multiple instances of an average magnitude of a subset of the instances of the geomagnetic field are computed. This may be a moving average of the estimated geomagnetic field magnitude, computed in accordance with the equations given above.

In operation 308, it is detected whether the average magnitude changes by more than a first predetermined threshold. This threshold may be selected at the time the compass function is developed, based on experimental and statistical data about the operation of the compass function in one or more like specimens of the portable device 100.

Finally, in operation 310, the user is informed that compass accuracy has degraded, in response to having detected that the average magnitude has changed by more than the first predetermined threshold. As suggested above, this may be in the form of either an alert or as more specific information concerning compass accuracy, or both. For example, an error bound may be estimated for a computed direction given by the compass; the user can be provided with an update to this estimated error bound (upon having detected that the moving average of the geomagnetic field magnitude has exceeded a threshold range). Another example is a computed certainty, which indicates the likelihood of the computed direction being correct.

The above-described functional components of the portable device 100 that are relevant to its compass function may be implemented in a variety of different ways. As is typical of current and future portable devices, the functionality therein is implemented using a combination of hardware, including hardwired circuitry, and software. In particular, the device 100 may have programmable circuitry that has been either previously configured by the manufacturer or executes a user downloadable program that is stored in the device 100, to perform many of the functions described above. Program storage may be implemented using one or more of various types of data storage media, e.g. fixed volatile or non-volatile solid state memory such as random access memory, removable non-volatile storage such as a flash memory card, and fixed mass storage such as an optical or magnetic rewritable disk drive. The storage may contain several program modules including, for instance, those that govern the functions of the calibrator 106, as well as that of the compass accuracy indicator module 111 and the user interface module 112. The programmed processor may include any suitable combination of programmable logical processing circuitry typically available for portable devices, such as an applications processor that is integrated in a typical multi-function smart phone, a central processing unit (CPU) such as that which may be found in a dedicated portable digital camera or a laptop personal computer, and a dedicated microcontroller or digital signal processor (DSP) chip. Although not explicitly shown in the figures, the coupling between the different functional unit blocks is understood to include all necessary analog and/or digital circuitry for interfacing between different types of signaling and integrated circuit topologies. Finally, in most instances, all of the signal processing functionality depicted in FIG. 2 may be implemented using solid state and integrated circuit packages that are integrated within the housing of the portable device 100. Additional features of the portable device 100, such as a battery as the main rechargeable power source, communications interfaces for communicating with networks such as telephone networks and data networks, and physical or virtual user interfaces such as keypads and touch screens, have not been described for the sake of brevity.

While certain embodiments have been described and shown in the accompanying drawings, it is to be understood that such embodiments are merely illustrative of and not restrictive on the broad invention, and that the invention is not limited to the specific constructions and arrangements shown and described, since various other modifications may occur to those of ordinary skill in the art. For example, although FIG. 1 depicts the portable device 100 as a smart phone, the accuracy indicator technology described here may also be implemented in other portable devices, such as a dedicated navigation device. Also, although the operations of a process are represented in a figure (and described) in a particular sequence, that sequence may not be required in all instances of that process. The description is thus to be regarded as illustrative instead of limiting.

What is claimed is:

1. A machine-implemented method for providing a user with accuracy indications for a compass, comprising:
    calculating a first plurality of instances of a geomagnetic field;
    calculating a second, different plurality of instances of the geomagnetic field;
    calculating an average magnitude of the first plurality of instances of the geomagnetic field;
    calculating an average magnitude of the second plurality of instances of the geomagnetic field;
    detecting whether the average magnitudes of the first plurality of instances and the second plurality of instances differ by more than a first predetermined threshold; and
    informing the user that compass accuracy has degraded, in response to having detected that the average magnitudes differ by more than the first predetermined threshold.

2. The method of claim 1 wherein calculating an average magnitude of the first plurality of instances, calculating an average magnitude of the second plurality of instances, and detecting whether the average magnitudes differ comprises:
    maintaining a moving average of the geomagnetic field and detecting whether the moving average changes by more than the first predetermined threshold.

3. The method of claim 2 further comprising:
    signaling a recalibration of the compass to recalculate an estimated interference field, in response to having detected that the moving average has changed by more than a second predetermined threshold.

4. The method of claim 1 further comprising:
    estimating an error bound for a computed direction given by the compass, wherein said informing the user comprises informing the user of the estimated error bound.

5. The method of claim 1 further comprising:
    signaling a recalibration of the compass to recalculate an estimated interference field using a different type of compass calibration process selected from the group consisting of a 2D process and a 3D process, in response to having detected that the moving average has changed by more than a second predetermined threshold.

6. A portable device comprising:
a portable device housing having integrated therein
a magnetic sensor;
a compass calibrator to compute a plurality of instances of a geomagnetic field based on an observed magnetic field and an estimated magnetic interference field;
a compass accuracy indicator module to calculate a plurality of instances of an average magnitude of a subset of the plurality of instances of the geomagnetic field, and to detect whether the average magnitude changes by more than a predetermined threshold; and
a user interface module coupled to drive one of a speaker and a display screen of the portable device, wherein the compass accuracy indicator module is to use the user interface module to inform a user of the portable device that compass accuracy has degraded in response to having detected that the average magnitude has changed by more than the predetermined threshold.

7. The portable device of claim 6 compass accuracy indicator module is to calculate a plurality of instances of an average magnitude and detect whether the average magnitude changes, in order to maintain a moving average of the geomagnetic field and detect whether the moving average changes by more than the predetermined threshold.

8. The portable device of claim 6 wherein the compass accuracy indicator module is to estimate an error bound for a computed compass direction output, and uses the user interface module to inform the user of the estimated error bound.

9. The portable device of claim 6 wherein the compass accuracy indicator module is to signal compass recalibration to recalculate the estimated interference field, in response to having detected that the average magnitude has changed by more than a second predetermined threshold.

10. An article of manufacture comprising:
a non-transitory machine-readable medium having stored therein instructions that program a processor, of a portable device having an integrated magnetic sensor, to compute a plurality of instances of a geomagnetic field using the magnetic sensor, calculate a plurality of instances of an average magnitude of a subset of the plurality of instances of the geomagnetic field, detect whether the average magnitude changes by more than a predetermined threshold, and signal a user interface module of the portable device that compass accuracy has degraded in response to having detected that the average magnitude has changed by more than the predetermined threshold.

11. The article of manufacture of claim 10 wherein the non-transitory machine-readable medium has stored therein further instructions that program the processor to calculate a plurality of instances of an average magnitude and detect whether the average magnitude changes, in order to maintain a moving average of the geomagnetic field and detect whether the moving average changes by more than the predetermined threshold.

12. The article of manufacture of claim 10 wherein the non-transitory machine-readable medium has stored therein further instructions that program the processor to estimate an error bound for a computed compass direction output, and signal the user interface module to inform the user of the estimated error bound.

13. The article of manufacture of claim 10 wherein the non-transitory machine-readable medium has stored therein further instructions that program the processor to signal compass recalibration to recalculate an estimated interference field, in response to having detected that the average magnitude has changed by more than a second predetermined threshold.

14. A machine-implemented method for providing a user with accuracy indications for a compass, comprising:
calculating a first set of two or more instances of a geomagnetic field;
calculating a second, different set of two or more instances of the geomagnetic field;
calculating an average magnitude of the first set of two or more instances of the geomagnetic field;
calculating an average magnitude of the second set of two or more instances of the geomagnetic field;
detecting whether a difference between the average magnitudes of the first set and second set exceeds a first predetermined threshold; and
informing the user that compass accuracy has degraded, in response to having detected that the difference between the average magnitudes has exceeded the first predetermined threshold.

15. The method of claim 14 wherein calculating an average magnitude of the first set and calculating an average magnitude of the second set comprises:
maintaining a moving average of the geomagnetic field.

16. The method of claim 14 further comprising:
estimating an error bound for a computed direction given by the compass, wherein informing the user comprises informing the user of the estimated error bound.

17. The method of claim 14 further comprising:
signaling a recalibration of the compass to recalculate an estimated interference field, in response to having detected that the difference between the average magnitudes has exceeded a second predetermined threshold.

18. A machine-implemented method for providing a user with accuracy indications for a compass, comprising:
calculating a plurality of instances of a geomagnetic field;
calculating a magnitude for each instance of the geomagnetic field;
maintaining a moving average of the magnitudes of the plurality of instances of the geomagnetic field;
detecting whether the moving average changes by more than a first predetermined threshold; and
informing the user that compass accuracy has degraded, in response to having detected that the moving average has changed by more than the first predetermined threshold.

19. The method of claim 18 further comprising:
estimating an error bound for a computed direction given by the compass, wherein informing the user comprises informing the user of the estimated error bound.

20. The method of claim 18 further comprising:
signaling a recalibration of the compass to recalculate an estimated interference field, in response to having detected that the moving average has changed by more than a second predetermined threshold.

* * * * *